Feb. 28, 1967 W. S. PEPPLER 3,306,001
METHOD FOR PRODUCING A HERMETICALLY SEALED PACKAGE
Filed Feb. 5, 1964 5 Sheets-Sheet 2
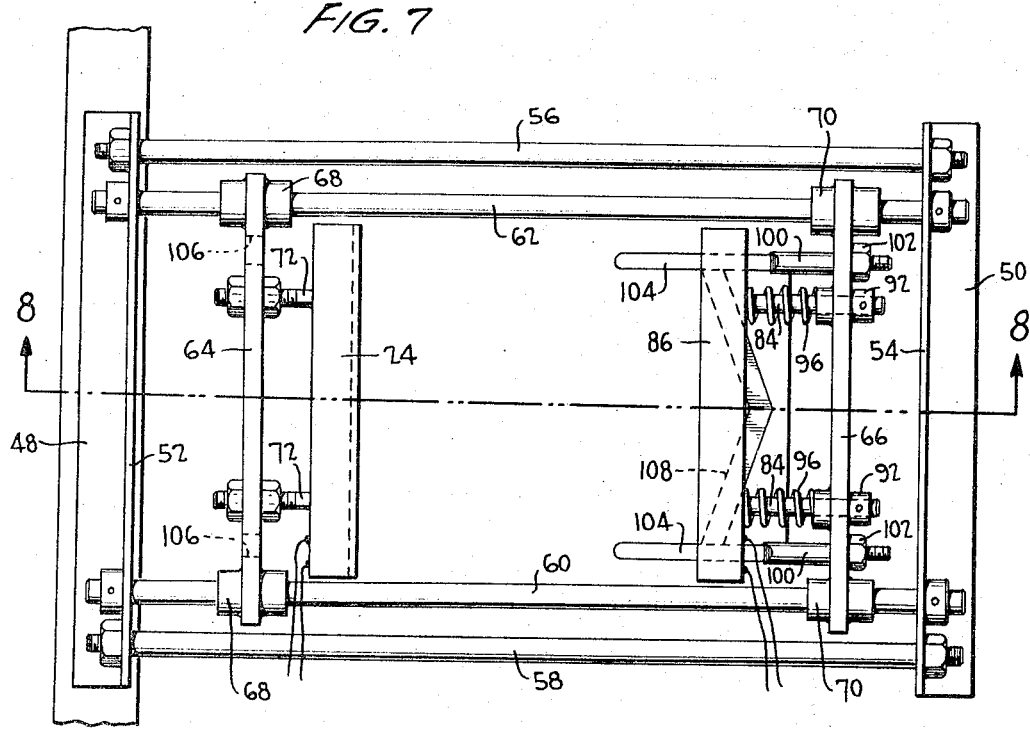
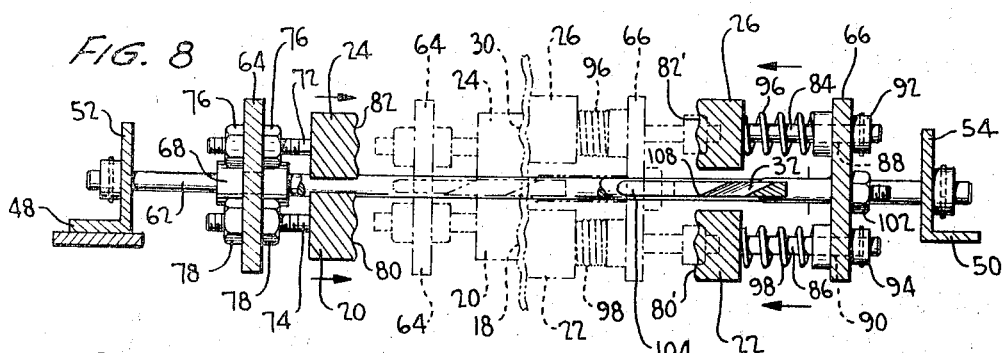
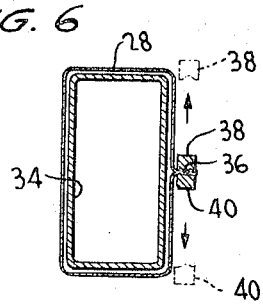
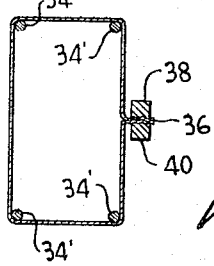
INVENTOR,
WILLIAM S. PEPPLER
BY KARL W. FLOCKS
ATTORNEY

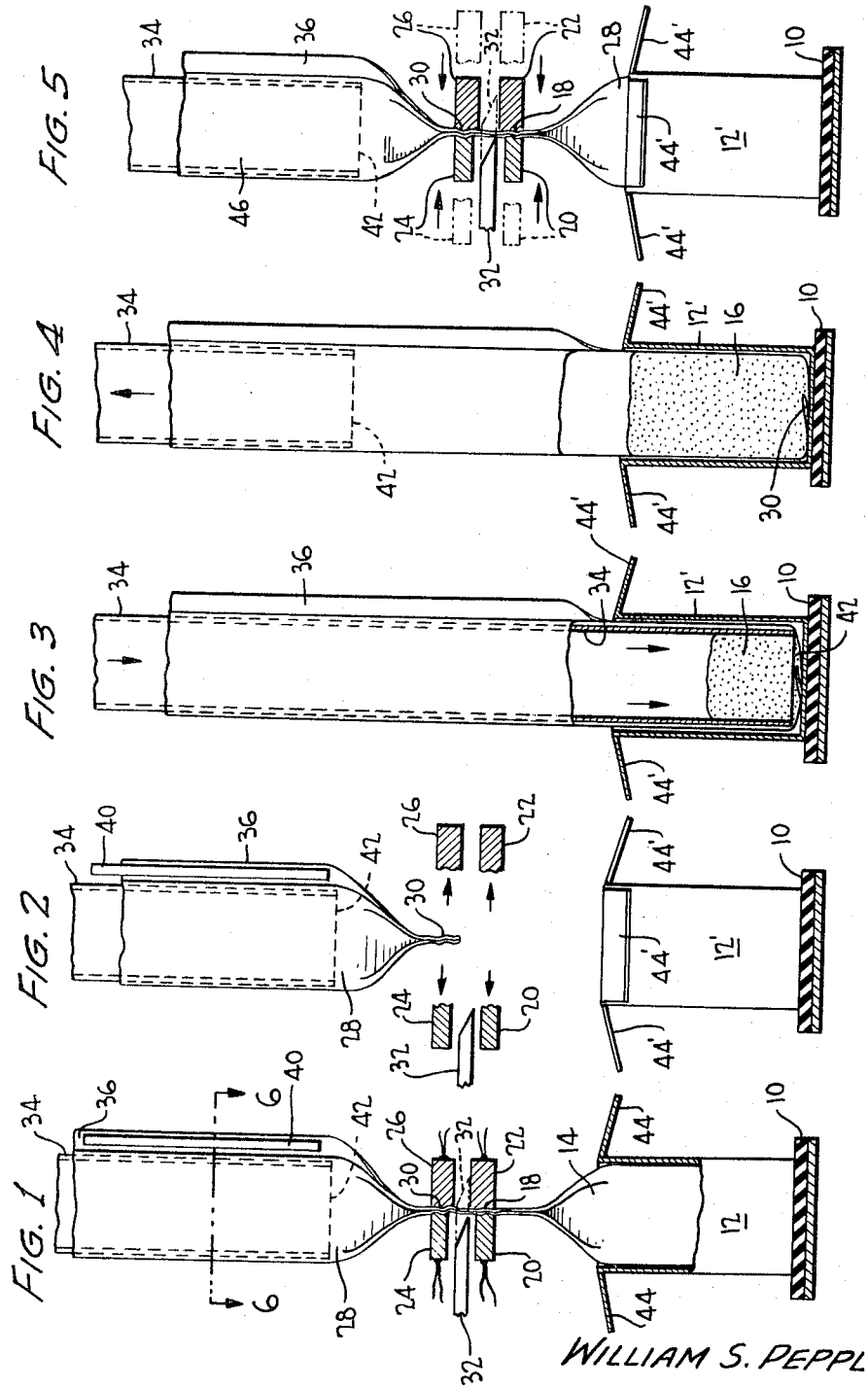

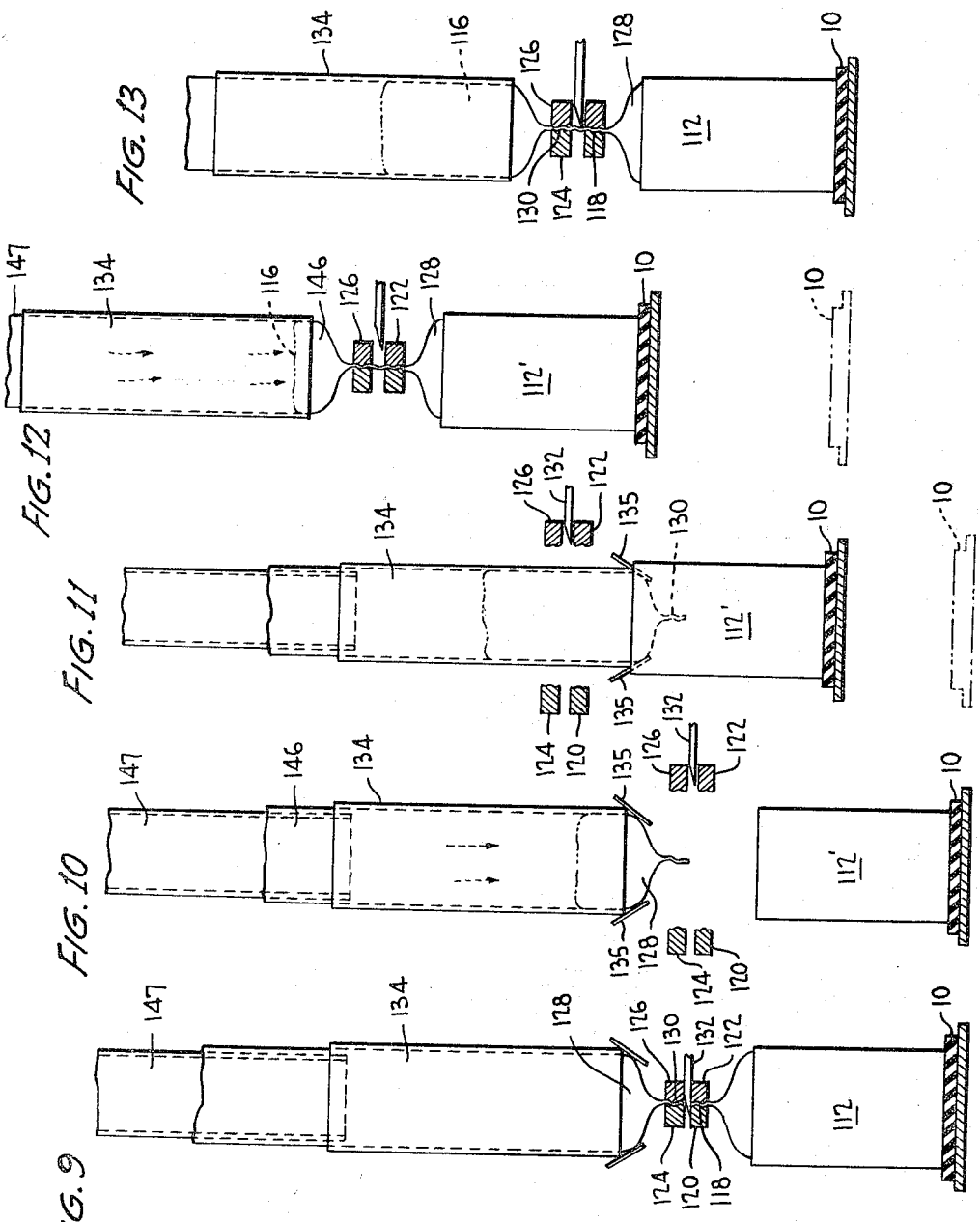

Feb. 28, 1967 W. S. PEPPLER 3,306,001
METHOD FOR PRODUCING A HERMETICALLY SEALED PACKAGE
Filed Feb. 5, 1964 5 Sheets-Sheet 4
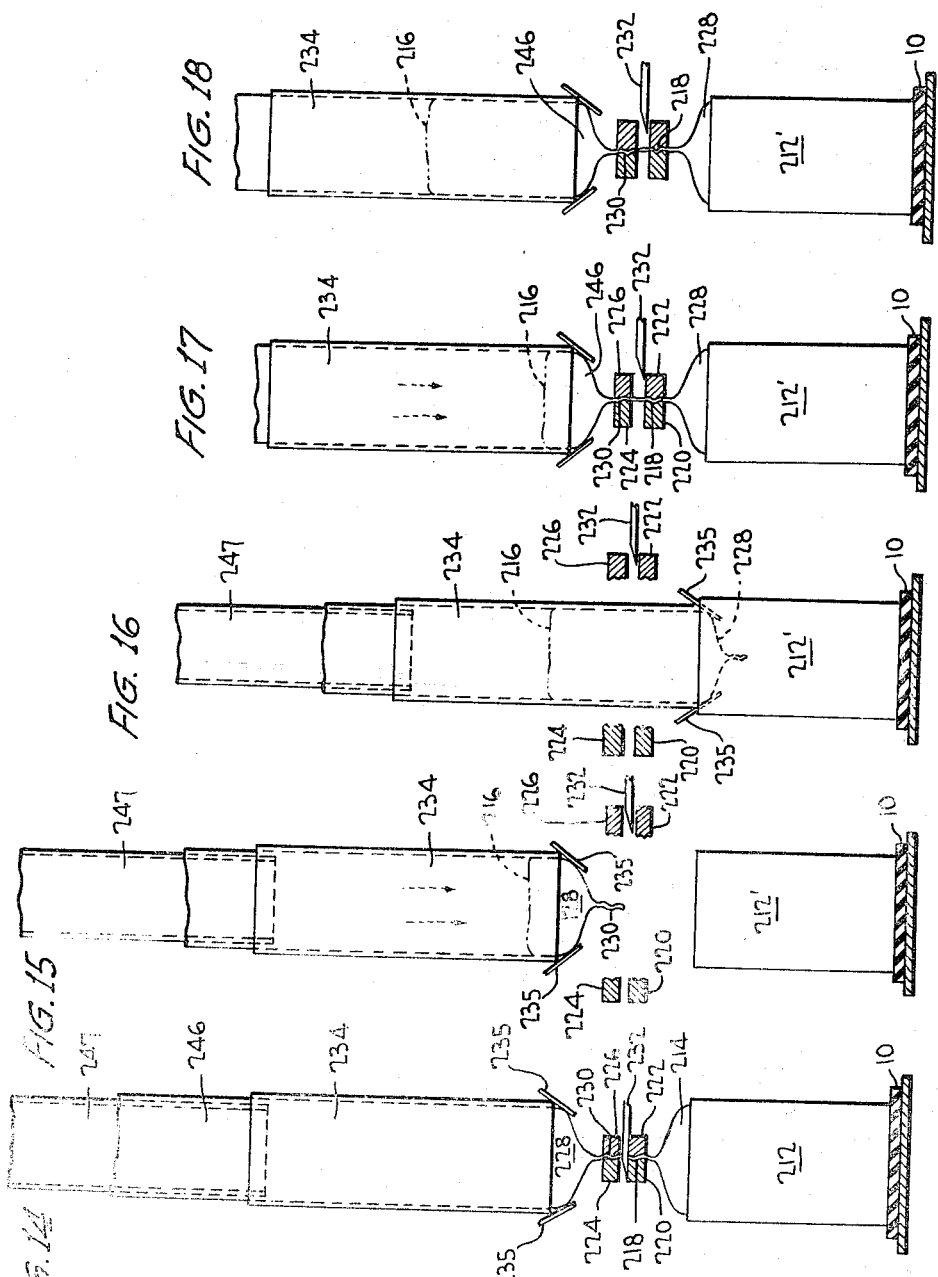
INVENTOR,
WILLIAM S. PEPPLER
BY KARL W. FLOCKS
ATTORNEY

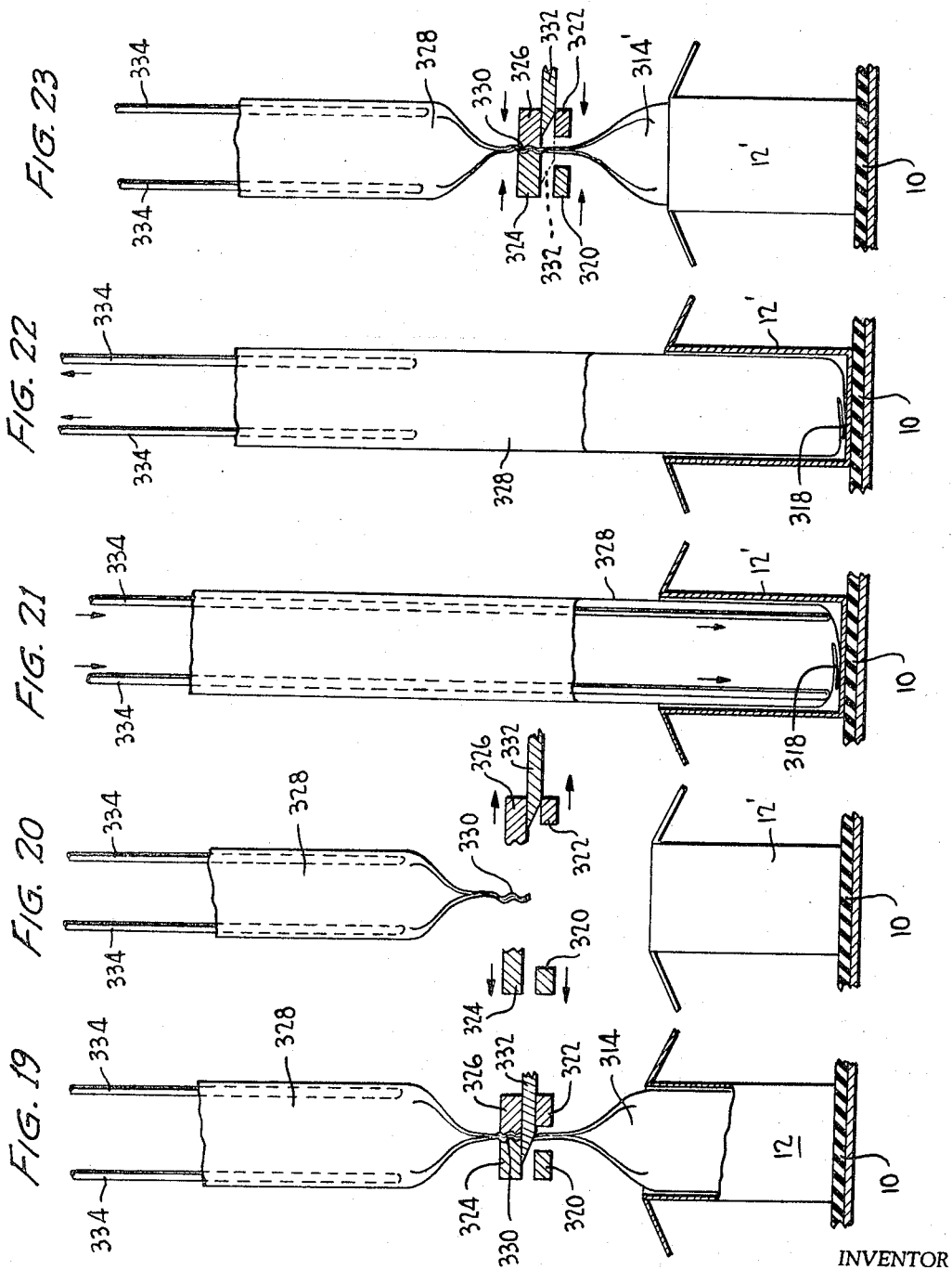

United States Patent Office 3,306,001
Patented Feb. 28, 1967

3,306,001
METHOD FOR PRODUCING A HERMETICALLY SEALED PACKAGE
William S. Peppler, Chappaqua, N.Y., assignor to Diamond International Corporation, a corporation of Delaware
Filed Feb. 5, 1964, Ser. No. 342,689
3 Claims. (Cl. 53—27)

This invention relates generally to paperboard containers, and more particularly to an improved and practical method and apparatus for forming, filling and sealing a paperboard container with a hermetically sealed lining.

There are many standard packing machines that will form, fill and seal bags produced from rolls of film. However, when a product being bagged requires a protection of a rigid paperboard container or the like, as well as the barrier properties of a sealed liner, i.e. bag, a combination bag-in-box is used. Although this application is primarily concerned with the formation of a hermetically sealed liner in a paperboard container, it will be readily apparent to those skilled in the art that containers other than those produced from paperboard may be utilized in the invention.

When a product is sealed in bags and then placed in cartons or containers at production speeds, the container, in the past, had to be oversized to permit entry of the maximum dimensions of the irregular shape of the sealed bag, thus resulting in a "slack-filled" container.

When an inner sealing liner was applied to a carton blank during manufacture, i.e. a laminated sealing liner, special equipment and relatively slow speeds in producing such containers, particularly due to critical controls, resulted in exceptionally high container cost.

A primary object of the present invention is to provide a practical method or system for forming, filling and sealing a container with a hermetically sealed lining.

Another object of the present invention is to provide a novel method and apparatus to produce a "bag-in-box" package where the sealed bag is not directly involved as part of the container manufacture, but where the package is filled and sealed as the preassembled containers are erected.

A further object of the present invention is to provide a "bag-in-box" package that is produced by utilizing a method and apparatus whereby the package is readily and reliably sealed on a production basis.

And yet another object of the present invention is to provide a novel method for inserting a bag into a container in a manner so that the bottom of the bag is hermetically sealed and the upper portion of the bag is opened for subsequently receiving a product therein.

And yet a still further object of the present invention is to provide means for continuously inserting bottom-sealed bags into an opened container or carton by means of a method promoting high speed production.

These, together with other and more specific objects, will become apparent from a consideration of the following specification taken in conjunction with the accompanying drawings forming a part thereof, wherein:

FIGS. 1–5 are essentially diagrammatic illustrations respectively illustrating the steps of producing a "bag-in-box" by one method of the invention;

FIG. 6 is a horizontal section taken substantially on line 6—6 of FIG. 1, and illustrating one type of shape-retaining mandrel of the invention;

FIG. 6a is a view similar to the view of FIG. 6, illustrating an alternate type of shape-retaining mandrel alternatively usable in the method of FIGS. 1–5;

FIG. 7 is an enlarged fragmentary top plan view particularly illustrating the heat-seal jaw and cutting blade assembly used in performing the method of the invention;

FIG. 8 is a vertical section taken substantially on the plane of line 8—8 of FIG. 7 showing by means of phantom lines the manner in which the heat-seal jaws and cutting blade function to form a seal between adjacent end portions of a continuous film from which the bags of the invention are produced;

FIGS. 9–13 are diagrammatic views respectively showing the successive steps of another method of performing the invention;

FIGS. 14–18 are diagrammatic views similar to FIGS. 9–13 and respectively show the successive steps of still another method for performing the invention; and FIGS. 19–23 are essentially diagrammatic views, similar to FIGS. 1–5, respectively, and illustrating the steps of still another method for producing a "bag-in-box" in which the upper end of the bag will remain open permitting the bag to be filled with a product at a remote location.

Referring to the drawings in detail, and first considering FIGS. 1–8, generally standard bag forming apparatus and carton set up apparatus will be utilized in performing the steps of the invention.

The bags will be produced from a continuous web of heat-sealable material which, as will subsequently be described, is formed with a seal along abutting longitudinal edges, and the adjacent ends of successively produced bags are heat sealed and cut or separated from each other.

The standard carton erecting apparatus will be of the character in which a preassembled carton can first be closed at its bottom and the upper closure flaps are disposed generally in a horizontal position. The carton is conveyed beneath the bag which has its upper end open and the lower end sealed and subsequently, as will be explained in detail, either the carton is raised onto the lower end of the bag or the bag, as it is filled, is lowered into the open top carton.

Considering FIG. 1, a horizontally disposed conveyor 10 has supported thereon an upwardly opening carton or container 12 in which a hermetically sealed bag 14 is disposed. The bag 14 has sealed therein the product to be packaged, such as confection sugar, flour, etc.

The upper end of the bag 14 will be heat sealed, as indicated at 18, by means of thermally controlled co-operating heat sealed bars 20 and 22. A second pair of thermally controlled heat sealed bars 24 and 26 will form, at the lower end of an adjacent or succeeding bag 28, a seal 30. Intermediately of heat sealing bars 20, 22 and 24, 26 is a reciprocable cutting blade 32 which will separate the seals 18 and 30.

As previously mentioned, the continuously or successively formed bags will be formed from a single continuous web of heat sealable material. These bags are formed by wrapping the web around a mandrel or tube 34 (see FIG. 6) and sealing the longitudinal edges to form a longitudinal seal 36 by means of longitudinally disposed, thermally controlled heat sealing bars 38 and 40. The mandrel or tube 34 will have the general cross section of the container or box 12 to aid in inserting the hermetically sealed bag into the container as will subsequently be described.

Considering FIG. 6a, an alternate mandrel for forming the bag to the shape of the box is shown, this mandrel comprising four right angularly related rod elements 34' which generally define the shape of the container into which the sealed bag will be inserted. In all respects, the rods 34' are substantially the full equivalent of the tubular sleeve or mandrel 34.

In FIG. 1, the hermetically sealed bag 14 has been deposited into the container 12, the upper seal of the bag having been formed by sealing elements 20, 22 simultaneously as a lower seal 30 is formed on the lower end of the next bag 28 by means of the sealing bars 24, 26. Substantially at the same time the seals 18 and 30 are formed, the knife blade 32 moves to the phantom line position shown in FIG. 1, accordingly severing or separating the seals 18 and 30. It will be noted that the lower edge 42 of the mandrel or sleve 34 extends substantially to the bottom of the bag 28.

The conveyor 10 then moves the container 12 and the hermetically sealed bag 14 therein from beneath the tube 34 and the sealing flaps 44 of the container 12 are closed in a conventional manner. The removal of the filled container 12 occurs after the heating shoes 20, 22, and 24, 26 have moved away from the seal 30 of the next sealing bag 28. The next container 12′, which has sealing flaps 44′ extending substantially horizontal, is moved into the position beneath the mandrel 34.

Referring to FIG. 3, the mandrel 34 is moved downwardly and carries with it the endless tube having the transverse seal 30 and longitudinal seal 36. At the same time that the mandrel 34 moves down, the product 16 is measured into the bottom-sealed tube.

After a predetermined amount of the product 16 is charged into the bag 28, the mandrel 34 is raised to the position shown in FIGS. 1 and 2. At this time the sealing bars 20, 22 and 24, 26 move from the phantom line to the solid line position shown in FIG. 5. The knife blade 32 also moves to the phantom line position shown, thus forming the upper seal 18 for the bag 28 to hemetrically seal the same, and forming the bottom seal 30 at the bottom of the next successive bag 46.

Referring to FIGS. 7 and 8, specific details of the heating bars and blade are shown. In these views, details of the forming tubes or mandrel, as well as the sealing bars for forming a longitudinal seal, have been omitted for purposes of clarity. Briefly, a pair of horizontally disposed angled elements 48 and 50 have extending between vertically extending flanges 52 and 54, respectively, rod elements 56 and 58. Inwardly of the rod elements 56, 58 are guide rods 62 and 60 which have reciprocably supported thereon guide and support plates 64 and 66 having fixed at opposite ends thereof guide sleeves 68 and 70, respectively, which are circumposed about the guide rods. The plate 64 has suitably secured thereto the transversely disposed heating shoes or blocks 24 and 20 (see FIG. 8) by means of threaded studs 72 and 74 and nut elements 76 and 78, respectively. The heating shoes 20 and 24 include inwardly facing undulated surfaces 80 and 82, respectively, for conforming to and receiving thereon a complementary portion of cooperating heating shoes 22 and 26, respectively.

The heating shoes 22 and 26 include inwardly facing undulating surfaces 80′, 82′ which will engage each other as illustrated by the phantom lines in FIG. 8 and form the previously described upper and lower seals 30 and 18 therebetween. The bars 26 and 22 have extending outwardly therefrom supporting rod elements 84 and 86 guidingly received in suitable apertured portions 88 and 90, respectively, of the plate 66. The rod portions 84 and 86 are terminally threaded and receive thereon retaining nuts 92 and 94 and have circumposed thereabout compression springs 96 and 98, respectively, which urge the heat sealing shoes 22 and 26 away from the mounting plate 66. Retained on the mounting plate 66 between the heat sealing shoes 22 and 26 is the horizontally disposed blade 32 which includes suitable support bars or rods 100 secured to oposite ends and a terminally threaded portion extending through the mounting plate and engaged by retaining nuts 102. The blade 32 has projecting forwarly therefrom guide pins 104 which will extend through suitable guide holes 106 in the mounting plate 64 when the seals 18 and 30 are being formed.

Considering FIG. 8, suitable means are provided for mechanical urging the heating shoes 20, 24 toward the shoes 22, 26. When the shoes 20, 22 and 24, 26 engage, as shown by phantom lines in FIG. 8, the mounting plate 66 will continue to move toward the shoes 20, 24, causing the springs 96 and 98 to be compressed as shown, and accordingly moving the cutting blade beyond the undulated surfaces 80′, 82′ of the shoes 22, 26. The shoes 20, 22 and 24, 26 will not only form the seals 18 and 30, but will retain the portion therebetween in the substantially taut condition for engagement by the shearing edge 108 of the blade 32.

Although not shown in detail, the heating shoes 20, 26 will have incorporated therein suitable heating elements and regulating thermal-couples or the like, to accordingly maintain the predetermined temperature required to form a hermetical seal for the hermetically sealed bags being inserted in containers. The forming mandrel 34 of the embodiment of FIGS. 1–6, for example, will be disposed in the rectangular space between the guide rod 60, 62 and heating shoes 24, 26 (see FIG. 7).

Referring to FIGS. 9–13 in FIG. 9, the conveyor 10 has disposed thereon a container 112 into which has been deposited a hermetically sealed bag. The bag has formed by shoes 120 and 122 at the upper end a seal 118. Heating shoes 124 and 126 form a seal 130 at the bottom of the next or succeeding bag 128 which will be inserted in the next or succeeding container 112′ when moved into position beneath the bag 128 as shown in FIG. 10. A reciprocable blade 132 movable with 122 and 126 will sever the bags 118 and 130 as in the previously described method.

The continuous web from which the bags are formed is received within a tubular sleeve 134 which restricts the outer dimension of the bag being filled. The sleeve 134 may have on the lower portion thereof guide or baffle plates 135 which will guide a filled bag into the underlying containers. The upper portion of the bag as indicated at 146, which have a longitudinal seal formed thereon as previously described with respect to the sealing bars 38 and 40, and a filling tube 147, is disposed within the bag-forming web.

After the lower seal 130 has been formed on the bag 128 and the heating shoes have moved to the position shown in FIG. 10, the container 112′ is raised to the position shown in FIG. 11, and the heating shoes 120–126 and blade 132 move therewith. The guide plates 135 on the lower end of the sleeve 134 are received in the upper end of the container 112′ and the container 112′ continues to move vertically to the position shown in FIG. 12, and at the same time the sleeve 134 is raised. After the parts reach the position shown in FIG. 12, i.e. when the bag 128 is disposed with the container 112′, the sealing jaws 120–126 move to the position shown wherein the seals 118 and 130 are formed. After the seal 130 is formed, the bag 146 will have the filling tube 147 therein and a measure of the product being packaged will begin to be discharged into the bag 146.

The conveyor 10 and container 112′ with the bag 128 therein will move downwardly to the position shown in FIG. 13 and the heating shoes 124 and 126 which are still engaged on the endless tube forming the bags, will aid in drawing the bags down to the position shown in FIG. 13. When the parts are in the position shown in FIG. 13, the bag 146 will be substantially filled with the discharge of the product being packaged, as indicated at 116, and the parts will then be lowered to the position shown in FIG. 9 for another cycle of operation.

Referring to FIGS. 14–18, in FIG. 14 the conveyor 10 has disposed thereon a container 212 which has deposited therein a hermetically sealed bag 214. The bag 214 has an upper seal 218 and the next oncoming bag 228 includes a lower seal 230, the seals being formed by heat sealing bars of the character previously described. The portion of the bag-forming web between the seals 218 and 230 will be severed by the blade 232 passing between the heat sealing bars 220–226. The continuous bag forming web has a longitudinal seal formed on its edge and will be received in a forming sleeve 234 having guide plates 235 on the lower ends thereof. The upper end 146 of the tube receives therein a filling tube 247, constituting the hermetically sealed bag formed after the bag 228 is formed.

The conveyor 10 moves the filled box 212 out of position beneath the tube 234 and repositions a new box or container 212' beneath the tube 234. As soon as the seal 230 has been formed a discharge of the product to be packaged, as indicated at 216, is deposited into the bag 128. The shoes 220–226, as well as the blade 232, are disposed to the open position shown in FIG. 15.

As the bag 228 is being filled with the material 216, the sleeve 234 and filling tube 247 are being lowered from the position shown in FIG. 15 to that of FIG. 16 wherein the plates 235 substantially engage with the upwardly opening end of the container or box 212'. The bag 228 is permitted to descend by gravity to the position shown in FIG. 17, and the sleeve 234 is raised to the initial position of FIG. 14. At this time the heat sealing jaws 220–226 form seals 218 and 230 between the hermetically sealed bag 228 and the bottom of the bag 246. The filling operation is initiated at this time, and the discharge of material 216 begins to enter the bag 246 which has its bottom sealed at 230. The blade 232 is moved from the position shown in FIGS. 17 and 18 to that of FIG. 14, whereupon the bag is severed between the seals 218 and 230 of the respective bags 228 and 246, and when the heating shoes and knife are withdrawn to the position shown in FIG. 15 the conveyor will remove the container 212', now containing the hermetically sealed bag 228, and reposition an empty upwardly opening container beneath the tube or sleeve 234.

In order to accommodate the disclosed method to installations where a product is normally dispensed into a carton or package at a remote location, the method illustrated by FIGS. 19–23 may be utilized. Briefly, a continuous tube is formed from a web by sealing the longitudinal edges as previously described; however the essential difference is that a seal is formed only above the knife blade forming the separate bags, and in this manner bags which are inserted into the cartons will be opened at their tops for subsequent filling at a remote location. Referring particularly to FIG. 19, a conveyor 10 has disposed thereon a container 12. A bag 314 having a bottom seal 318 (see FIG. 21) has been inserted into the container 12.

The continuous tube 328 from which the bags are formed are formed about four right angularly related, mutually parallel rods 334 which define a mandrel substantially conforming to the inner dimensions of the container 12. A pair of heat-sealed shoes 324 and 326 are disposed in opposed relationship and function to form a transverse, hermetical seal 330 as will subsequently be described. Indicated at 332 is a reciprocable knife disposed above a pair of spaced guide shoes 320 and 322 which move with the heat sealing shoes 324 and 326 but which do not engage the bag 314.

In FIG. 19, the bag 314 has already been inserted into the container 12, the blade 332 has formed a transverse cut beneath the seal 330 so that the bag 314 will be opened at its top. The container 12 with the bag 314 therein will be conveyed from beneath the endless tube 328 and an upwardly opening, empty container 12' will be disposed beneath the endless tube 328 as illustrated in FIG. 20.

The heating shoes 324, 326 together with the guide elements 320, 322 and the blade 332 will be moved outwardly away from the seal 330 transversely at the lower end of the endless tube 328.

As seen in FIG. 21, the mandrel formed by the rods 334 will move downwardly engaging the bottom of the tube 328 and urging it to the bottom of the container 12'. The rods 334 may be supplemented or assisted by air pressure, since in this method, as compared with those previously described, the bags will not be filled as they are being lowered into an open container, and thus the weight of the product will not aid in inserting the bag within a box. Although a mandrel formed from rods 334 is illustrated, it is readily apparent that mandrels having a rectangular, oval or circular cross section may likewise be utilized in this in the previously described methods.

After the endless tube 328 has been inserted into the container 12', it is withdrawn as illustrated in FIG. 22, and if necessary air pressure may be utilized to maintain the bag within the container 12' while the mandrel formed from the rods 334 is being withdrawn to the position shown in FIG. 22.

After the mandrel formed from the rods 334 has been raised, the heat-seal bars 324, 326 are moved toward each other in the manner indicated to form a seal 330 at the bottom of the endless tube 328 thus forming a bag 314' which is opened at its top inasmuch as the knife blade 332 will move to the position shown by phantom lines to sever the lower end of the endless tube 328 below the seal 330.

Thus it is readily apparent that by providing guide shoes 320, 322 at the position where heat sealing shoes or bars 20 and 22 are provided in FIG. 1, it is possible to continuously form bags in a box with an opened upper end to permit the product to subsequently be inserted into the bag, and after this has been done the bag will be sealed at a remote location.

It will be noted in each of the disclosed methods that means are provided whereby the outer dimensions of the hermetically sealed bags are substantially maintained to permit the ready entry of the filled and sealed bag to enter an upwardly opening container. Heretofore, as previously mentioned, it was necessary to have a container which would incorporate a dimension comparable to the largest possible dimension of a hermetically sealed bag in order to operate with any kind of production. In the present method, and as described in the three disclosed embodiments, a continuous web of heat sealable material is formed with a longitudinal seal and intermediate transverse sealing is accomplished between successive bags being formed. At the same time that a lowermost hermetically sealed bag is inserted into an upwardly opening container, the next succeeding bag (see FIGS. 1–5) is disposed in position to be inserted into the next upwardly opening container that is positioned therebeneath. After the next succeeding bag is inserted into the newly positioned container, a charge of the product being packaged is disposed therein and the seal between this bag and the next bag is accomplished.

When comparing the method of FIGS. 1–5 with that of FIGS. 9–13, it will be observed that this method illustrates the manner in which paperboard containers or the like may be moved into receiving relationship with the sealed bag which will be packaged in the paperboard container. In this embodiment, it will be noted that filling of the sealed bag can occur earlier in this method than is generally possible in the method of FIGS. 1–5.

Further, in comparing the method of FIGS. 14–18 with those previously described, it will be observed in this method that filling of the bag will occur substantially at the same time as in the method of FIGS. 9–13. The methods of FIGS. 9–13 and 14–18 apparently will permit a higher production rate than might be available in the method of FIGS. 1–5. However, in all of the methods disclosed it is clearly evident that a hermetically sealed bag, which normally has non-uniform dimensions and is extremely difficult to insert into a paperboard or similar container, can now readily be inserted in a container through the use of the disclosed methods.

Additionally, the method disclosed in FIGS. 19–23, just as in the previously described methods, facilitates a high rate of production as well as provides a bag in a box wherein the bag substantially conforms to the inner dimensions of the box thus eliminating the necessity for "slack-filled" containers, due to the necessity for having an oversized container to accommodate an irregularly shaped hermetically sealed bag.

The present methods apparently will be useful in packaging fluid-like powders such as sugar, flour, etc. However, it is readily apparent to those skilled in the art that liquids can likewise be packaged through the utilization of the disclosed methods, and thus the methods are quite applicable to all flowing materials.

It will be obvious to those skilled in the art that various changes may be made without departing from the scope of the invention and therefore the invention is not limited to what is shown in the drawings and described in the specification but only as indicated in the appended claims.

What is claimed is:

1. The method of continuously producing packages having a rigid outer container having a minimum volume in relation to the amount of material contained in a hermetically sealed bag, comprising the steps of:

continuously forming an endless, heat-sealable film into a tubular sleeve on a rigid mandrel and heat sealing the leading end of said sleeve;

continuously orienting upwardly opening, rigid cartons beneath said leading end of said sleeve and in coaxial alignment therewith;

maintaining the cross section of said sleeve equal to the interior of the rigid container;

filling the sleeve with a charge of fluent material while continuing to maintain the sleeve cross section uniform and conforming to the interior cross section of said rigid carton;

introducing said sleeve with the charge contained therein into the rigid container and withdrawing the rigid mandrel progressively so that the charge of material and sealed leading end of the sleeve substantially fill the rigid container; and sealing the trailing end of the sleeve below the rigid mandrel thus forming a hermetically sealed bag in the rigid container while forming the sealed leading end of the next successive bag formed from the flexible sleeve and to be disposed in the next oriented rigid container.

2. The method as claimed in claim 1, including the step of lowering said sleeve and mandrel simultaneously into the rigid container while simultaneously discharging the fluent material therein.

3. The method as claimed in claim 1, including the step of raising said rigid container while simultaneously lowering said mandrel and tubular sleeve into the rigid container.

References Cited by the Examiner

UNITED STATES PATENTS

| | | | |
|---|---|---|---|
| 2,214,944 | 9/1940 | Vogt | 53—27 XR |
| 2,532,871 | 12/1950 | Wagner | 53—27 |
| 2,969,627 | 1/1961 | Leasure | 53—28 |
| 3,114,994 | 12/1963 | Joa | 53—182 |
| 3,237,371 | 3/1966 | Gerlach | 53—182 |

GRANVILLE Y. CUSTER, JR., *Primary Examiner.*